3,321,296
METHOD FOR THE PREPARATION OF AN ORGANIC SOIL CONDITIONER FROM PEAT-MOSS
Ryonosuke Abbe, 36 Ikebukuro, Naka-ku, Yokohama, Kanagawa Prefecture, Japan
No Drawing. Filed Mar. 12, 1964, Ser. No. 351,546
4 Claims. (Cl. 71—24)

This invention relates to a method for the preparation of an organic soil conditioner from peat-moss by treating said peat-moss with a member selected from the group consisting of calcium hydroxide and magnesium hydroxide at elevated temperatures.

It is well known that the peat-moss contains one or more percent nitrogen therein and has been widely produced from all parts in the world. However, the peat-moss can not be used as an immediate effect fertilizer or a soil conditioner, because it contains the nitrogen in the state of a cyclic compound and also has a high acidity due to an organic acid such as humic acid or lignic acid. The cyclic compound can not be deomposed into a water soluble nitrogen compound at normal atmospheric pressure and room temperature or by the action of an earth bacteria unless a long time was passed. The inventor has found the fact that the acidity of the peat-moss can not be permanently neutralized with calcium hydroxide in the conventional manner following neutralization methods 1 to 2, because the peat-moss treated by such a method recovers its acidity after it is applied to an arable land by the following course that the calcium component is washed out with rain water.

(1) Five grams of granular peat-moss is impregnated in 50 cc. of an aqueous saturate solution of calcium hydroxide at normal atmospheric pressure and room temperature for 50 hours.

(2) One gram of granular peat-moss is impregnated in 50 cc. of an aqueous saturate solution of calcium hydroxide at normal atmospheric pressure and room temperature 50 hours.

There is observed the same results in the case of using ammonium hydroxide for the neutralization of the peat-moss, that is, the neutralized peat-moss recovers its acidity after it was applied to an arable land and the ammonium component thereof was consumed by the plants. Thus, the acidity of the peat-moss prevents a growth of plants and makes it unsuitable for use as a farmyard manure or a substitutive fertilizer.

The inventor, however, has found the fact that acidity of the peat-moss can be completely neutralized with calcium hydroxide by the following neutralization procedures 3 to 4.

(3) Ten grams of granular peat-moss are mixed with 0.125 gram of calcium oxide and 300 cc. of water, and the resulting mixture is heated for 2 hours under 4 atmospheric pressures in an autoclave.

(4) Ten grams of granular peat-moss are mixed with 0.125 gram of calcium oxide and 300 cc. of water, and the resulting mixture is heated for 2 hours under 7 atmospheric pressures in an autoclave.

In general, an object of this invention is to provide a method for the preparation of an organic soil conditioner from less valuable peat-moss. Other objects of this invention will be obvious from the detailed explanation hereinafter.

In order to achieve the objects of this invention, the inventor has long investigated and discovered the fact that the peat-moss must be impregnated or formed into a paste with an aqueous solution comprising at least one elected from the group consisting of calcium hydroxide, magnesium hydroxide and a mixture thereof and then heated under pressure in an autoclave thereby to convert organic acids such as lignic and humic acid to their salts. In such a case, it is found that the heating time is reduced as the pressure is increased. For example, the heating time is required for about ten hours, several hours or scores of minutes when 2, 3 or 5 atmospheric pressures are used respectively.

Further, the inventor has discovered the fact that the peat-moss must be mixed with an aqueous solution comprising at least one selected from the group consisting of calcium hydroxide, magnesium hydroxide and a mixture thereof to form a paste and then the paste must be heated at a temperature from 140° C. to a temperature below the critical temperature of water under pressure of above 10 atmospheric pressures thereby to convert organic acids such as lignic and humic acid to their salts and simultaneously to split nitrogen-containing cyclic compounds into water soluble nitrogen compounds, namely, into a kind of nitrogen manure. In such a case, it is assumed that said hydroxides act as catalysts.

Still further, the inventor has discovered the fact that the peat-moss must be heated with an aqueous solution comprising at least one selected from the group consisting of calcium hydroxide, magnesium hydroxide and a mixture thereof in the presence of at least one selected from the group consisting of potassium hydroxide, sodium hydroxide, ammonium hydroxide, amines and a mixture thereof at an elevated temperature of 20° to 140° C., preferably 40° to 80° C. thereby to convert organic acids such as lignic and humic acid to their salts.

In this case, it is apparent that the potassium hydroxide, sodium hydroxide, ammonium hydroxide or the amine acts as a catalyst for the neutralization reaction and that in the first step, the catalyst reacts with the organic acids contained in the peat-moss to form their salts and in the second step, the organic acid salts are substituted by calcium ion or magnesium ion to form calcium salts or magnesium salts of organic acids with the liberation of a free catalyst which is recycled into the first step reaction.

The actions and effects of the catalyst, for example, of sodium hydroxide are proved from the tests conducted as follows:

The peat-moss is heated in a 1% aqueous solution of sodium hydroxide at 100° C. to cause the complete neutralization of organic acids contained in the peat-moss and then calcium hydroxide is added thereto in an amount of 5% (calculated as CaO) by weight of the dried peat-moss and the resulting mixture is heated at 20°, 40°, 60°, 80° and 100° C. for 30 minutes respectively. At this time, the resulting products are washed with hot water and then with carbonic acid to eliminate excess sodium hydroxide and an unreacted calcium hydroxide and the finished products are analyzed as listed in the following table.

TABLE

| Total Calcium Oxide contained in the Raw peat-moss (percent) | Total Calcium Oxide contained in the Finished Products heated at— | | | | |
|---|---|---|---|---|---|
| | 20° C. | 40° C. | 60° C. | 80° C. | 100° C. |
| 0.59 | 0.61 | 4.21 | 4.39 | 4.41 | 4.40 |

As obvious from the table, the organic acids contained in the peat-moss are substantially converted into calcium salts at above 40° C., whereas the conversion is not completed at 20° C. for 30 minutes.

Therefore, it should be understood that in a modification process in accordance with this invention, the peat-moss may be previously treated with an aqueous solution of at least one catalyst mentioned above and then subjected to the heat treatment in the presence of an aqueous solution comprising at least one member selected from calcium hydroxide, magnesium hydroxide and a mixture thereof and also that such a member can be used in excess of an amount theoretically required.

The invention is illustrated by the following examples.

Example 1

100 parts by weight of peat-moss which is produced in Japan and analyzed as 53.6% water, 5% ash, 5.4% lignic acid, 36% humic acid, pH=3.6 were mixed with calcium hydroxide corresponding to 2.5% calcium oxide by weight based on the raw peat-moss and 300 parts by weight of water to form a paste. The paste was charged into an autoclave and heated under 4 atmospheric pressures for 2 hours and then allowed to stand for 20 hours to complete the reaction. When the resulting product was dried, the dried product was obtained in the granular state with a yield of 45% based on the weight of raw material and had pH values of 6.4.

It is proved that the dried product can be used as an excellent soil conditioner from the pot tests conducted in the conventional manner by using the rice plants.

Example 2

A peat-moss was crushed into particles having a size of about 3 mm. The crushed peat-moss containing 87% water was mixed with water in an amount equal to the peat-moss and calcium hydroxide corresponding to 7% calcium oxide by weight based on the dried raw material to form a paste. The paste was charged into an autoclave and heated at 250° C. under 100 atmospheric pressures for 5 minutes. The reaction product was removed from the autoclave and dehydrated, dried and then crushed into granular particles. The dried product was obtained with a yield of 80% based on the weight of raw material and contained 1.6% nitrogen.

When the dried product is used as a soil conditioner, it is proved that tobacco plant has a better harvest as compared with that of an arable land not containing the dried product.

Example 3

A peat-moss which is analyzed as 87% water and pH=3.6 was mixed with water in an amount equal to the peat-moss to form a paste. Then, the paste was mixed with calcium hydroxide corresponding to 5% calcium oxide and 0.05% sodium hydroxide by weight based on the dried raw material. The resulting mixture was heated at 60° C. for 30 minutes thereby to convert all organic acids to their calcium salts. The final product had pH values of 6.8 and did not decrease its pH value when it was washed with rain water. Also, it is proved that the final product is a good humus and an excellent soil conditioner.

What I claim is:

1. A method for the preparation of an organic soil conditioner from peat-moss which comprises treating the peat-moss with an aqueous solution of at least one member selected from the group consisting of calcium hydroxide and magnesium hydroxide to form a past mixture and then heating the resulting paste mixture at an elevated temperature under pressure of at least two atmospheres.

2. A method for the preparation of an organic soil conditioner from peat-moss which comprises mixing the peat-moss with an aqueous solution of at least one member selected from the group consisting of calcium hydroxide and magnesium hydroxide to form a paste and then heating the resulting paste at a temperature of from 140° C. to a temperature below the critical temperature of water under pressure of above 10 atmospheric pressures in an autoclave.

3. A method for the preparation of an organic soil conditioner from peat-moss which comprises heating the peat-mass with an aqueous solution of at least one member selected from the group consisting of calcium hydroxide and magnesium hydroxide and at least one member selected from the group consisting of potassium hydroxide, sodium hydroxide, ammonium hydroxide, amines and a mixture thereof at an elevated temperature of 20° to 140° C.

4. A method as in claim 3 wherein the temperature is from 40° to 80° C.

References Cited by the Examiner

UNITED STATES PATENTS

| | | | |
|---|---|---|---|
| 610,957 | 9/1898 | Zschorner | 162—92 |
| 2,038,994 | 4/1936 | Flieg | 71—24 |
| 2,317,990 | 5/1943 | Grether | 71—24 X |

S. LEON BASHORE, *Acting Primary Examiner.*

DONALL H. SYLVESTER, *Examiner.*

R. BAJEFSKY, *Assistant Examiner.*